United States Patent [19]

Kido

[11] Patent Number: 5,191,575
[45] Date of Patent: Mar. 2, 1993

[54] PLATE SPRING AND NUT INTERCONNECTING FOR USE IN AN OPTICAL PICK-UP MOVING APPARATUS

[75] Inventor: Kunio Kido, Tokyo, Japan

[73] Assignee: Tanashin Denki Co., Ltd., Tokyo, Japan

[21] Appl. No.: 803,717

[22] Filed: Dec. 5, 1991

Related U.S. Application Data

[63] Continuation of Ser. No. 488,711, Mar. 5, 1990, abandoned.

[30] Foreign Application Priority Data

Mar. 6, 1989 [JP] Japan .................... 1-25397[U]

[51] Int. Cl.⁵ .................... G11B 21/02; F16B 7/00
[52] U.S. Cl. .................... 369/223; 403/334; 403/345
[58] Field of Search .............. 360/105, 106, 107, 109, 360/104; 369/176, 177, 215, 219, 220, 223; 403/333, 334, 345

[56] References Cited

U.S. PATENT DOCUMENTS

| | | | |
|---|---|---|---|
| 232,641 | 9/1880 | Harrow | 403/345 X |
| 2,127,593 | 8/1938 | Gramann | 369/223 |
| 2,128,645 | 8/1938 | Gramann | 369/223 |
| 2,174,167 | 9/1939 | Rattray | 369/223 |
| 2,174,226 | 9/1939 | Goldman | 369/223 |
| 2,900,660 | 8/1959 | Wuerker, Jr. | 403/345 X |
| 4,422,112 | 12/1983 | Tanaka | 360/109 X |
| 4,528,607 | 7/1985 | Thompson | 74/424.8 A |
| 4,750,068 | 6/1988 | Akasaki et al. | 360/106 |
| 4,783,708 | 11/1988 | Hasegawa | 360/106 |
| 4,825,432 | 4/1989 | Takahashi | 369/219 |
| 4,833,558 | 5/1989 | Baheri | 360/104 |

FOREIGN PATENT DOCUMENTS

| | | | |
|---|---|---|---|
| 58-084215 | 5/1983 | Japan | 403/345 |
| 62-092181 | 4/1987 | Japan | 369/215 |
| 63-140465 | 6/1988 | Japan | 369/215 |
| 63-209073 | 8/1988 | Japan | 369/215 |
| 63-181161 | 11/1988 | Japan. | |

*Primary Examiner*—John W. Shepperd
*Assistant Examiner*—Edward H. Sikorski
*Attorney, Agent, or Firm*—Lieberman & Nowak

[57] ABSTRACT

A pick-up mechanism for a disk-type record medium reproduction apparatus is disclosed. This mechanism is suitable for use in a compact disk player and employs a plate spring to connect a nut mounted on a pick-up moving screw with the pick-up unit. Pressure contacts mounted on the outer surface of the nut and on the front end of the plate spring, steady the nut and eliminate gaps between the nut and the pick-up screw. By eliminating these gaps, information can be read from the disk with increased precision.

7 Claims, 10 Drawing Sheets

PLATE SPRING AND NUT INTERCONNECTING FOR USE IN AN OPTICAL PICK-UP MOVING APPARATUS

This is a continuation of application Ser. No. 488,711, filed Mar. 5, 1990, now abandoned.

BACKGROUND OF THE INVENTION

This invention relates generally to a disk-type record medium reproduction apparatus, and more particularly, to a pick-up moving mechanism which easily detects a position of the pick-up unit by reducing vibration of the pick-up unit caused by the presence of two gaps. The first gap is between the pick-up moving screw and the nut, and the second gap is, radially and axially of the screw, an engagement between the nut and a connecting member stemming from the body of a pick-up unit.

Generally, in the disk-type record medium reproduction apparatus, information recorded on the disk-type record medium such as Compact Disk (CD) is reproduced by rotating the record medium, irradiating the recorded side of the record medium with a laser, and reading the reflected light from the recorded side.

In the mechanical operation, the angle of inclination of the object lens is consequently changed with the fixing of the pick-up unit and the irradiating direction of the laser is consequently moved outward from the record medium, thereby allowing the reading of the reflected light. The pick-up unit is moved outwardly with the pitch moving everytime the amount of movement reaches a predetermined value, for example, 0.5 mm. Such operation then is repeated. When pitch moving the pick-up unit, the object lens detects position information from the pick-up unit with high speed movement. At the same time, the pick-up unit is moved forwardly or rearwardly and severely or finely so as to reach next position. Accordingly, the object lens must be carefully attached to the pick-up unit to allow for precise movement.

In a conventional pick-up moving mechanism, such as the kind of the reproduction apparatus, shown in FIG. 24 and FIG. 25, a nut c is attached to part of pick-up unit b which is threadedly engaged on pick-up moving screw a. Pick-up unit b is moved via linear guide rod e by rotating pick-up moving screw a from motor d. Nut c is engaged to connecting member g stemming from body f of pick-up unit b. It is very difficult to assemble and obtain an accuracy of parallelism between guide rod e and pick-up moving screw a.

Accordingly, there is a slight gap $h_1$ in the direction of rotation of pick up moving screw a between connecting member g and nut c so as not to negatively effect the accuracy of positioning of pick-up unit b and not obtain a high accuracy of parallelism. There is also another gap $h_2$ in the axial direction of moving screw a.

If the motor d is repeatedly rotated in both directions severely or finely so as to detect the position of pick-up unit b, nut c vibrates severely in same direction since there are slight gaps $h_1$ and $h_2$ between connecting member g and nut c. Such vibration makes nut c strike against connecting member g. A shock induced by such strike is transferred to body f of pick-up unit b.

As a result, the object lens attached to the pick-up unit responds sensitively to severe vibration. Accordingly, the prior art mechanisms have the problems of taking too much time to respond or the inability to accurately read the recording side. The subject invention provides a solution to these problems.

SUMMARY OF THE INVENTION

It is a general object of the present invention to provide an improved pick-up moving mechanism for disk-type record medium reproduction apparatus which prevents the vibration of the object lens and surely and speedly reads out information on the recording side.

In order to achieve the object of the invention, the invention utilizes a pick-up moving mechanism for disk-type record medium reproduction apparatus comprising a nut which is threaded in a pick-up moving screw and engaged with the front end of a connecting member the connecting member stemming outwardly from the body of the pick-up unit moving along the linear guide rod by rotating the pick-up moving screw, characterized in that the connecting member is formed, either totally or substantially by the plate spring itself, the position regulating means is made by contacting the connecting member to the nut so as to control the relative position of the connecting member and the nut in radial and axial direction of the pick-up moving screw, first pressure contacts are mounted on a outer surface of the nut, second pressure contacts are mounted at front end of the plate spring so as to give resilient force to the first pressure contacts in radial direction of the nut. Further one of the first and second pressure contacts forms a protruding portion and the other forms an opening, all or part of the contacting portion of both pressure contacts forms a slope, and at least a part of the position regulating means forms a contacting portion between the slope and the opposite member thereto. Slope is defined with respect to a line drawn radially through the rotational axis of the pick-up moving screw in the direction of the resilient force provided by the plate spring. The line is typically drawn perpendicular to the face of the plate spring and is preferably perpendicular to the base plate.

In accordance with one aspect of the invention, one of said first and second pressure contacts forms a conical protruding portion and the other forms a circular opening, whereby a circumference of the circular opening contacts a side of the conical protruding portion.

In accordance with another aspect of the invention, one side of the protruding portion forms a slope and the other side forms a slope or a non-slope. The opening includes a V-shaped portion contacting both sides thereof with the slope on one side of the protruding portion and a support in the opening contacting with the slope or non-slope on the other side of the protruding portion against the slope.

In accordance with still another aspect of the invention, one side of the protruding portion forms a slope and the other side forms a non-slope. The opening includes a V-shaped portion contacting both sides thereof with the non-slope and a support in the opening contacting to the slope against the non-slope.

In accordance with still another aspect of the invention, at least one of the sides of the protruding portion forms a slope, any one side includes a V-shaped guide an extention of which is substantially perpendicular to the axis of the pick-up moving screw, the opening includes a protruding portion or support engaged with both sides of the V-shaped guide and a V-shaped portion which contacts with side of the protruding portion.

In accordance with still another aspect of the invention, the connecting member includes a pair of movement limiters adjacent to sides of the nut or contacting end of the connecting member in a direction axial to the pick-up moving screw so as to control axial movement of the nut.

In accordance with still another aspect of the invention, one of the first and second pressure contacts forms a conical or pyrimidal protruding portion and the other forms a conical or pyrimidal opening of which angle is larger than that of the protruding portion, the position regulating means is made by contacting the end of said protruding portion to the deepest center of the opening.

In accordance with still another aspect of the invention, the connecting member includes two pairs of movement limiters adjacent to both axial sides of the pick-up moving screw and both radial sides of the nut so as to control axial and/or radial movement of the nut.

The position regulating means makes it possible to prevent relative movement between the nut and the connecting member in axial direction of the pick-up moving screw and in radial direction of the nut so that the contacting gap between the nut and the screw becomes substantially zero and vibration in axial and radial direction of the nut is restrained.

Movement limiters mounted on the connecting member make it possible to improve an engagement of the pick-up body with the nut by the resilient of the plate spring.

BRIEF DESCRIPTION OF THE DRAWINGS

The preferred embodiment of the invention will now be described, by way of example, with reference to the accompanying drawings in which.

DETAILED DESCRIPTION OF THE INVENTION

Figure 1:
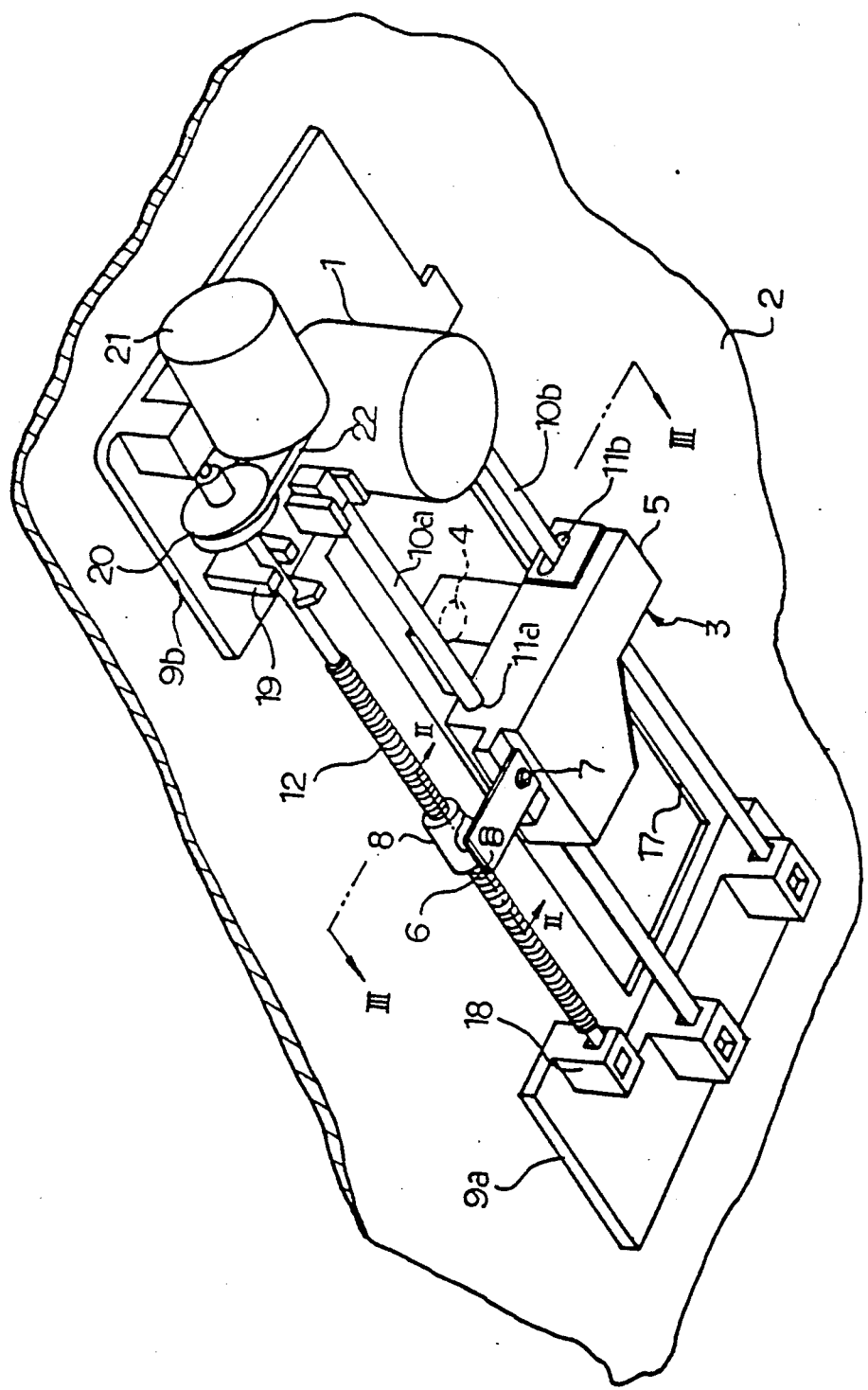
FIG. 1 is a perspective bottom view of the pick-up moving apparatus according to an embodiment of the invention.

Referring now to the FIG. 1 through FIG. 4, the 1st embodiment of the invention will be described. FIG. 1 shows the turntable driving motor 1 attached to the base plate 2 and the pick-up unit 3. The upper portion of the pick-up unit 3 includes a body 5 having an object lens 4. A plate spring 6 represents the connecting member and is fixed by the screw 7 to the body. The upper end of the plate spring 6 is outwardly protruded to be engaged in the nut 8.

A pair of plastic pick-up supporting plates 9a and 9b are fixed by the screw on the bottom of the base plate 2. A pair of guide rods 10a and 10b are mounted in parallel between the two supporting plates 9a and 9b. Each of the guide rods 10a and 10b is engaged into the holes 11a and 11b and the pick-up unit 3 is easily movable in parallel with the base plate 2. It is noted that the hole 11a for one guide rod 10a is an exact circle and the hole 11b for the other guide rod 10b is an ellipse. The pick-up moving screw 12 is also supported in parallel with the guide rods 10a and 10b between the two pick-up supporting plates 9a and 9b. The nut 8 is engaged in the moving screw 12.

Figure 2:
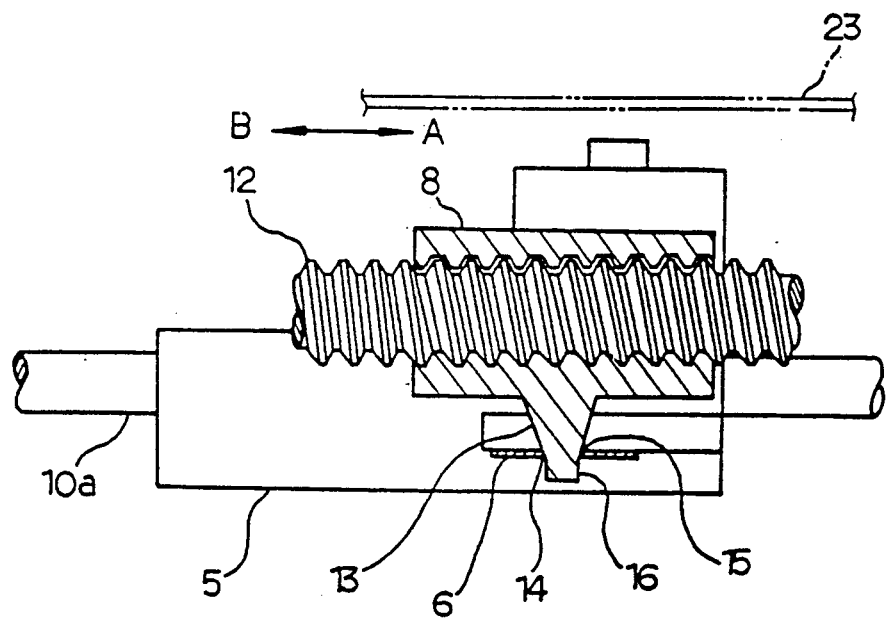
FIG. 2 is a sectional view taken along line II—II of FIG. 1.
Figure 3:
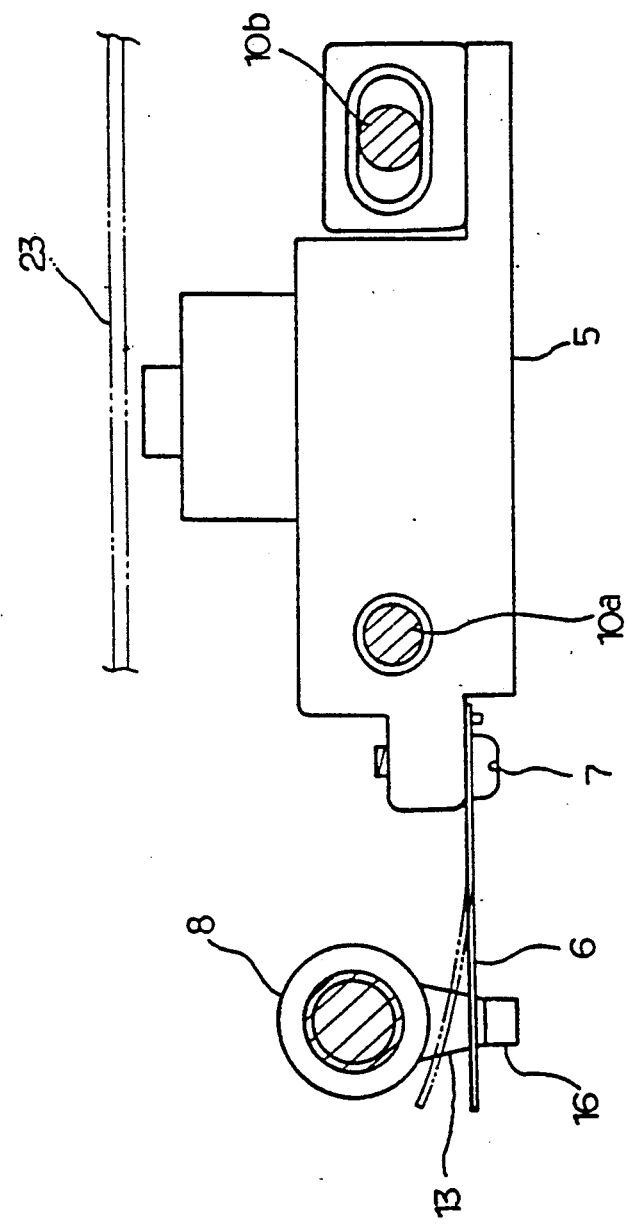
FIG. 3 is a sectional view taken along line III—III of FIG. 1.

As shown in FIG. 2 and FIG. 3, mounted on the outer surface of the nut 8, as the first pressure contact, is the conical protruding portion 13 and mounted on the upper end of the plate spring 6, as the second pressure contact, is the circular hole 14.

A position regulating means 15 is formed by the conical surface and on the entire circumference of the opening of the circular hole 14 which is contacted to the conical surface by radially pressure contacting the circumference of the circular hole 14 and the conical surface of the conical protruding portion 13.

The position regulating means 15 enables the nut 8 and the plate spring 6 to move integrally by regulating axially and radially the position of the conical protruding portion 13 and the circular hole 14.

A small circumferencial portion 16 is formed at the front end of the conical protruding portion 13, and prevents the circular hole 14 of the plate spring 6 from escaping out of the nut 8 when, for example, the nut 8 is rapidly moving.

The upper portion of the body 5 in the pick-up unit 3 extends upwardly through the opening 17 formed in the base plate 2, and moves in the direction of arrow A B as shown in FIG. 2 according to the rotation of the pick-up moving screw 12.

Both ends of the pick-up moving screw 12 are rotatably supported by the shaft receptacles 18 and 19 integrally formed on the each pick-up supporting plate 9a and 9b.

Fixedly mounted on the one end of the pick-up moving screw 12 is a pully 20 which is driven by the pick-up moving motor 21 through the endless belt 22 and which allows pitch movement of the pick-up unit 3 by the given amount of rotation of the pick-up moving screw 12.

The disk-type record medium 23 is set on the turntable (not shown) and rotated by the turntable driving motor 1. At this time the pick-up unit 3 driven by the pick-up moving motor 21 takes a given amount of pitch movement following the guide rods 10a and 10b.

In such moving operation of the pick-up unit 3, the position regulating means 15 makes the nut 8 and the plate spring 6 moved integrally since the resilient force of the plate spring 6 is always forwarded to the nut 8. Accordingly the axial and radial vibration of the nut 8 is securely constrained where the pick-up moving motor 21 repeats a forward and reward rotation severely or finely in order to detect the position of the pick-up unit 3.

On the other hand, the resilient force of the plate spring 6 toward the nut 8, i.e. in the radial direction of the pick-up moving screw 12, makes a gap between the conical protruding portion 13 and the circular hole 14 virtually non-existent. Accordingly the rotation of the pick-up moving screw 12 is securely transferred to the nut 8.

Figure 4:
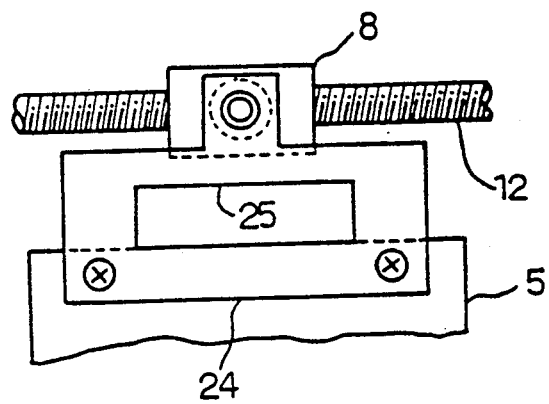
FIG. 4 is a bottom view of the outskirts of the connecting member according the 2nd embodiment of the invention.

FIG. 4 shows the 2nd embodiment of the invention wherein the plate spring 24 has a relatively large width (i.e., axial width of the pick-up moving screw 12) in the contacting portion to the body 5. Therefore, the axial inclination of the plate spring 24 can be regulated and reduced. The regulation of inclination of the plate spring 24 permits the connection to be improved so that the rotation of the pick-up moving screw 12 is more surely transferred to the pick-up unit 3. Formed on the central portion of the plate spring 24 is a rectangular slot 25 so as not to damage the plate spring 24 by bending in the direction of thickness itself.

Figure 5:
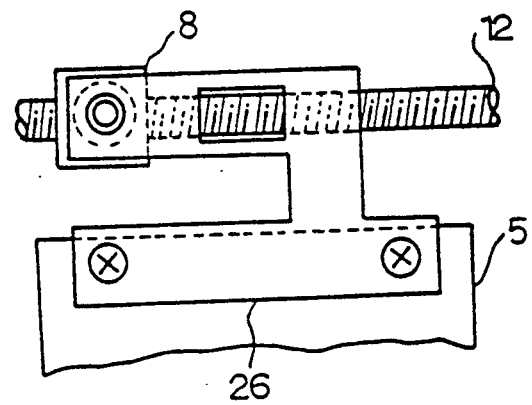
FIG. 5 is the same view as FIG. 4 according to the 3rd embodiment of the invention.

FIG. 5 shows the 3rd embodiment of the invention which has the same object as the 2nd embodiment. The plate spring 26 is formed by cutting away one side of the plate spring 24 of the 2nd embodiment shown in FIG. 4. With this shape of the plate spring 26, it is possible to obtain a sufficient bending of the plate spring 26 in the direction of the thickness itself and regulate the possibility of axial inclination of the plate spring 26 by the same width of the contacting portion as is in the 2nd embodiment.

Figure 6:
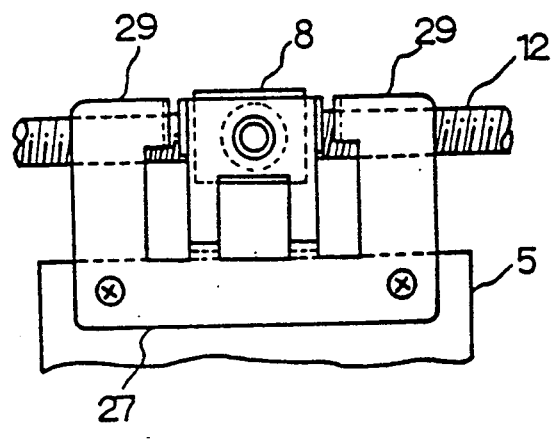
FIG. 6 is the same view as FIG. 4 according to the 4th embodiment of the invention.

FIG. 6 shows the 4th embodiment of the invention which includes a pair of movement limiters 29 adjacent to the both sides of the front end in which the nut 8 is engaged with the plate spring 27. Accordingly, the engaged front end with the nut 8 is intended to produce an axial inclination on the pick-up moving screw 12 by the self-resilient force of the plate spring 27. Therefore, it is possible to regulate the inclination of the engaged front end by contacting one side of the front end with one of the movement limiters 29, thereby it is providing an improved contact of the pick-up unit 3 to the nut 8. Also it is preferred to arrange a pair of with the movement limiters 29 closely positioned on the both sides of the nut 8. In this case, it is possible to regulate an inclination of the engaged front end of the plate spring 27 by contacting the nut 8 with the movement limiters 29.

Figure 7:
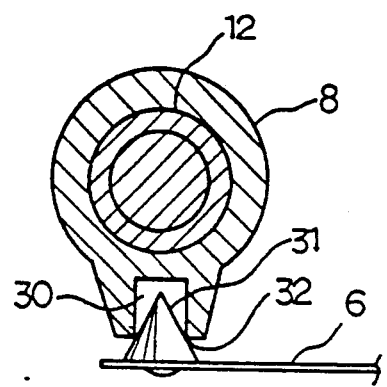
FIG. 7 is the same view as FIG. 3 according to the 5th embodiment of the invention.

FIG. 7 shows the 5th embodiment of the invention in which the circular hole 30 represents the first pressure contact and is mounted on the outer surface of the nut 8 and the conical protruding portion 31 represents the second pressure contact and is mounted on the front end of the plate spring 6 thereby allowing the conical surface of the conical protruding portion 31 to engage with the hole 30.

Since the position regulating means 32 is made by contacting the conical surface of the conical protruding portion 31 to the outer end of the circular hole 30, the same effect as the first embodiment is obtained. In this embodiment, the conical protruding portion 31 may be a frustum (i.e., truncated cone prepared by with removing the front end of the conical protruding portion 31), and a taper or a ring may be attached to the outer end of the circular hole 30.

Figure 8:
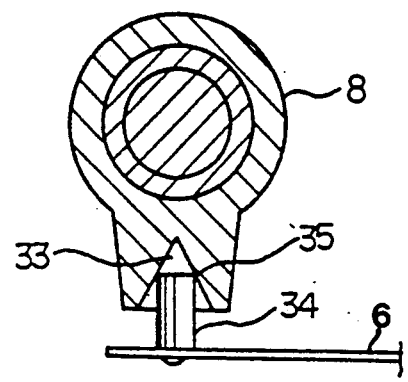
FIG. 8 is the same view as FIG. 3 according to the 6th embodiment of the invention.

FIG. 8 shows the 6th embodiment of the invention in which the conical hole 33 represents the first pressure contact and is mounted on the outer surface of the nut 8 and the circular protruding portion 34 represents the second pressure contact and is mounted on the front end of the plate spring 6. Since the position regulating means 35 is made by contacting the circumferential outer end of the circular protruding portion 34 to the conical surface of the conical hole 33, the same effect as the first embodiment is obtained. In this embodiment, the conical hole 33 may be (i.e., a truncated cone prepared by removing the deepest portion thereof,). A taper or a ring may be attached to the front of the circular protruding portion 34.

Figure 9:
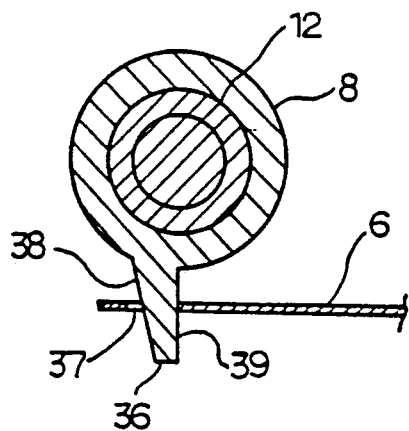
FIG. 9 and FIG. 10 are the same views as FIG. 3 and FIG. 4, respectively, according to the 7th embodiment of the invention.
Figure 10:
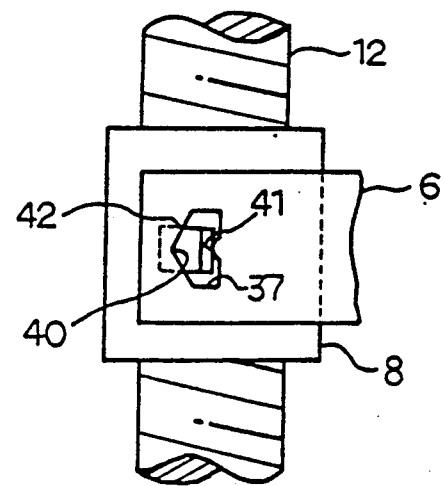

FIG. 9 and FIG. 10 show the 7th embodiment of the invention in which the protruding portion 36 is formed on the outer surface of the nut 8 and the opening 37 is formed on the front end of the plate spring 6. One side of the protruding portion 36 is a slope 38 and the other is a non-slope 39 and extension of which is substantially perpendicular to the axis of the pick-up moving screw 12. In the edges of the opening 37, there is a V-shaped portion 40 which engages with the both sides of the slope 38. Support 41 is pressure-contacted to the non-slope 39 against the V-shaped portion 40. Since the position regulating means 42 is made by contacting both edges of the slope 38 to the both sides of the V-shaped portion 40 and the support 41 to the non-slope 39, the same effect as the first embodiment is obtained. In this embodiment, relations between the protruding portion 36 and the opening 37 may be reversed, that is, the protruding portion 36 or the like is mounted on the front end of the plate spring 6 as shown in FIG. 9 and a boss having an opening having a cross-sectional view similar to opening 37 as shown in FIG. 10 is mounted on the outer surface of the nut 8.

Figure 11:
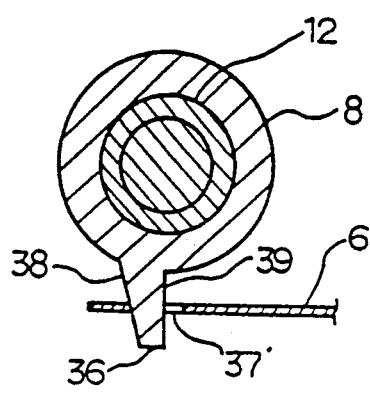
FIG. 11 and FIG. 12 are the same views as FIG. 3 and FIG. 4, respectively, according to the 8th embodiment of the invention.
Figure 12:
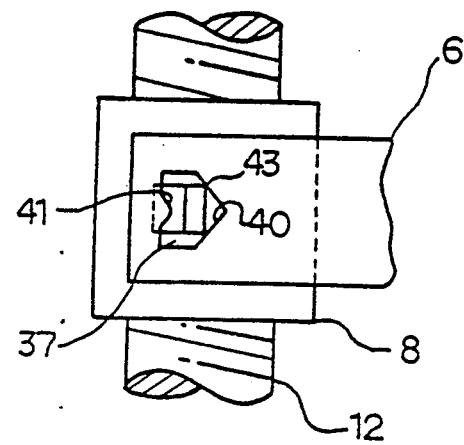

FIG. 11 and FIG. 12 show the 8th embodiment of the invention in which the same protruding portion 36 as shown in FIG. 7 is mounted on the nut 8, but the opening 37 is reversed compared with the opening 37 in the 7th embodiment. Specifically, the positioning relations between the V-shaped portion 40 and the support 41 is reversed. Since the position regulating means 43 is made by contacting the support 41 to the slope 38 and both edges of the non-slope 39 to both sides of the V-shaped portion 40, the same effect as the first embodiment is obtained.

Figure 13:
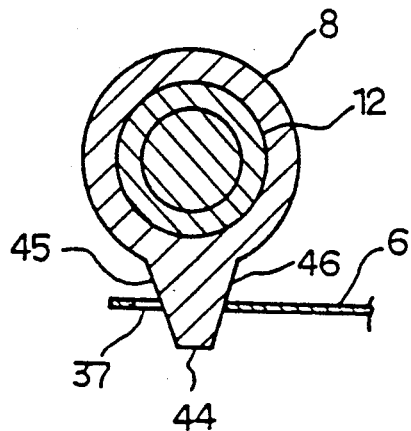
FIG. 13 and FIG. 14 are the same views as FIG. 3 and FIG. 4, respectively, according to the 9th embodiment of the invention.
Figure 14:
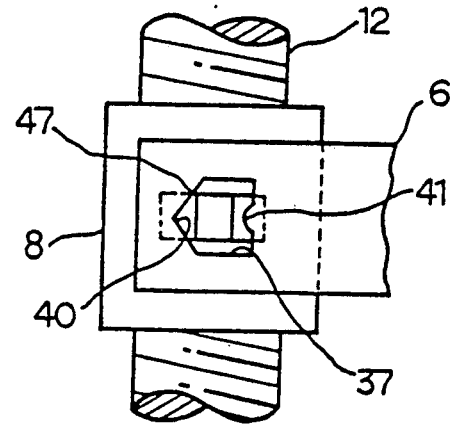

FIG. 13 and FIG. 14 show the 9th embodiment of the invention in which the shape of the protruding portion 44 is different from the one 36 in the 8th embodiment as shown in FIG. 11. Both sides of the protruding portion 44 are formed by slopes 45 and 46. Accordingly, the one slope 45 is engaged with the both sides of the V-shaped portion 40 in the opening 37, and the other slope 46 is engaged with the support 41 in the opening 37. Since the position regulating means 47 is made by contacting both sides of the V-shaped portion 40 to both edges of slope 45, and since the support 41 in the opening 37 is contacted with the other slope 46, the same effect as the first embodiment is obtained. In this embodiment, relations between the protruding portion 36 and the opening 37 may be reversed, that is, it is possible to form the protruding portion in the plate spring 6 and to mount the opening on the nut 8.

Figure 15:
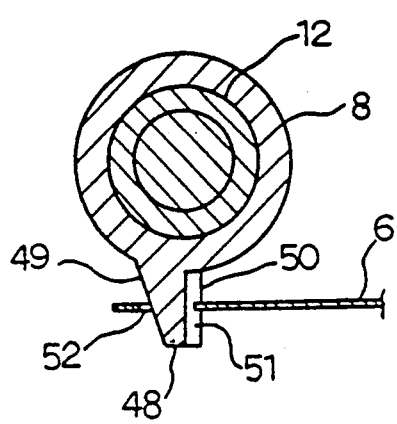
FIG. 15 and FIG. 16 are the same views as FIG. 3 and FIG. 4, respectively, according to the 10th embodiment of the invention.
Figure 16:
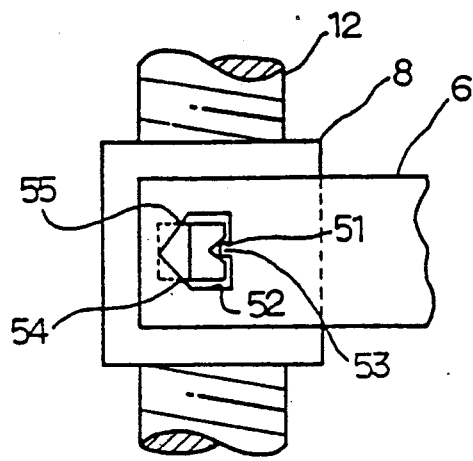

FIG. 15 and FIG. 16 show the 10th embodiment of the invention in which the protruding portion 48 is formed on the outer surface of the nut 8. One side of the protruding portion 48 is a slope 49 and the other is a non-slope 50. Formed on the non-slope 50 is V-shaped guide 51 an extention of which is substantially perpendicular to the axis of the pick-up moving screw 12. In the edges of the opening 52 formed in the plate spring 6, there is a small protruding portion 53 of the opening 52 engaged with both sides of the V-shaped guide 51 and V-shaped portion 54 pressure-contacted to both edges of the slope 49 against the protruding portion 53 in the opening 52. Since the position regulating means 55 is made by contacting both sides of the V-shaped guide 51 to the protruding portion 53 in the opening 52 and both edges of the slope 49 to both sides of the V-shaped portion 54, the same effect as the first embodiment, the is obtained. In this embodiment, the V-shaped guide 51 may be formed on the slope 49 so that both sides of the guide 51 are engaged with the protruding portion 53 of the plate spring 6 and both sides of the V-shaped portion 54 of the plate spring 6 are engaged with the both edges of the non-slope 50. Moreover, the same effect as described above is obtained when the protruding portion 48 is formed on the plate spring 6 and the opening 52 is formed on the nut 8.

Figure 17:
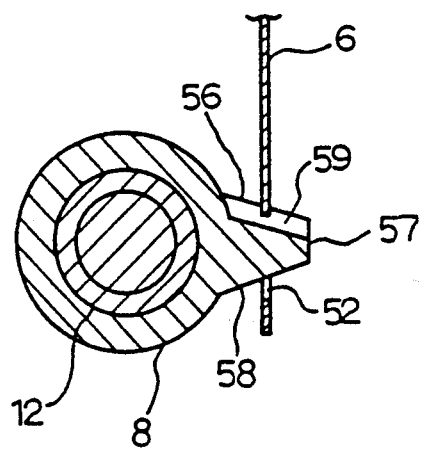
FIG. 17 and FIG. 18 are the same views as FIG. 3 and FIG. 2 through FIG. 4, respectively, according to the 11th embodiment of the invention.
Figure 18:
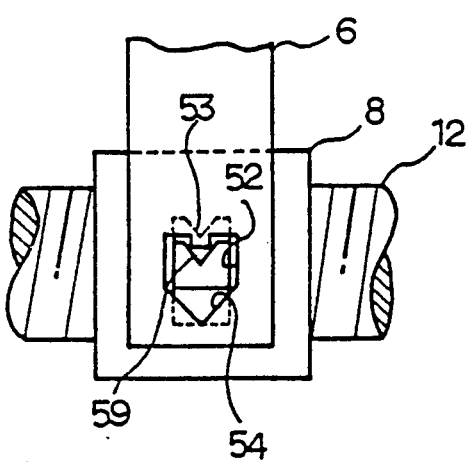

FIG. 17 and FIG. 18 show the 11th embodiment of the invention in which the non-slope 50 of the protruding portion 48 in the 10th embodiment as shown in FIG. 15 is replaced by a slope 56. Both sides of the protruding portion 57 are formed by slopes 56 and 58. The slope 56 includes a V-shaped guide 59. By contacting the protruding portion 53 with both sides of the guide 59, and both edges of the slope 58 to the both sides of the V-shaped portion 54, the same effect as the first embodiment is obtained. In this embodiment, it is also possible to form the protruding portion 57 in the plate spring 6 and to mount the opening 52 on the nut 8.

Figure 19:
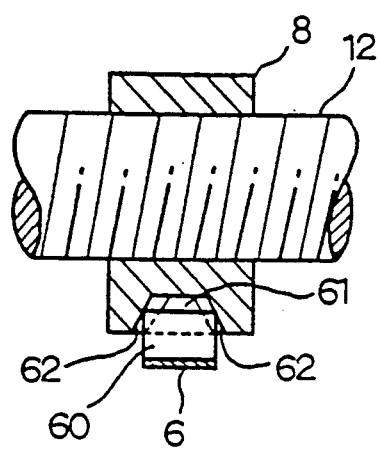
FIG. 19 through FIG. 21 are the same view as FIG. 2 through FIG. 4 respectively, according to the 12th embodiment of the invention.
Figure 20:
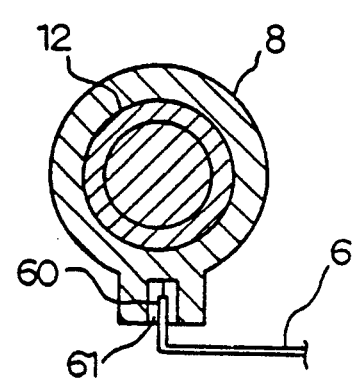
Figure 21:
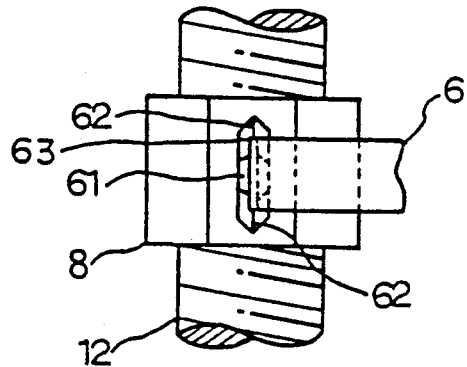

FIG. 19 to FIG. 21 show the 12th embodiment of the invention in which the front end of the plate spring 6 is bent at a right angle so as to serve as the protruding portion 60. A hole 61 corresponding to the opening described above is formed on the nut 8. Both opposite sides of the hole 61 are tapered toward the inner portion thereof. V-shaped portions 62 are mounted on the opposite side of the hole 61. Since the position regulating means 63 is effected by contacting the four corners (when observed in a cross-sectional view) with the protruding portion 60 (i.e., the four sides of the two opposite V-shaped portions 62), the same effect as the first embodiment is obtained. The same effect is also obtained when V-shaped portion 62 is changed to a U-shaped portion. It is also possible to round the four corners of the protruding portion 60.

Figure 22:
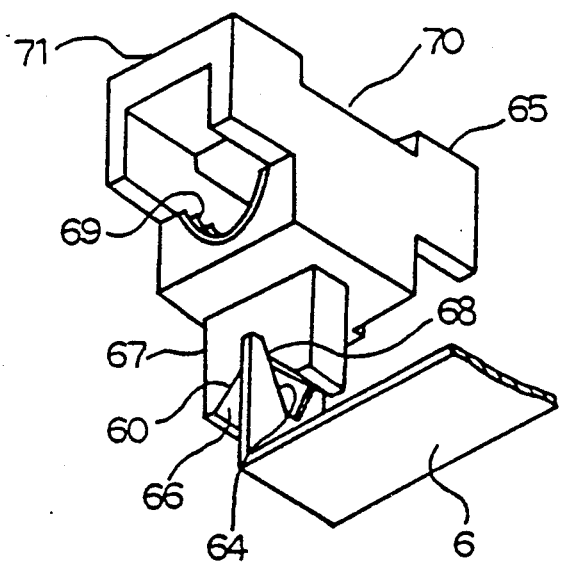
FIG. 22 is a bottom view of the outskirts of the connecting member according to the 13th embodiment of the invention.
Figure 24:
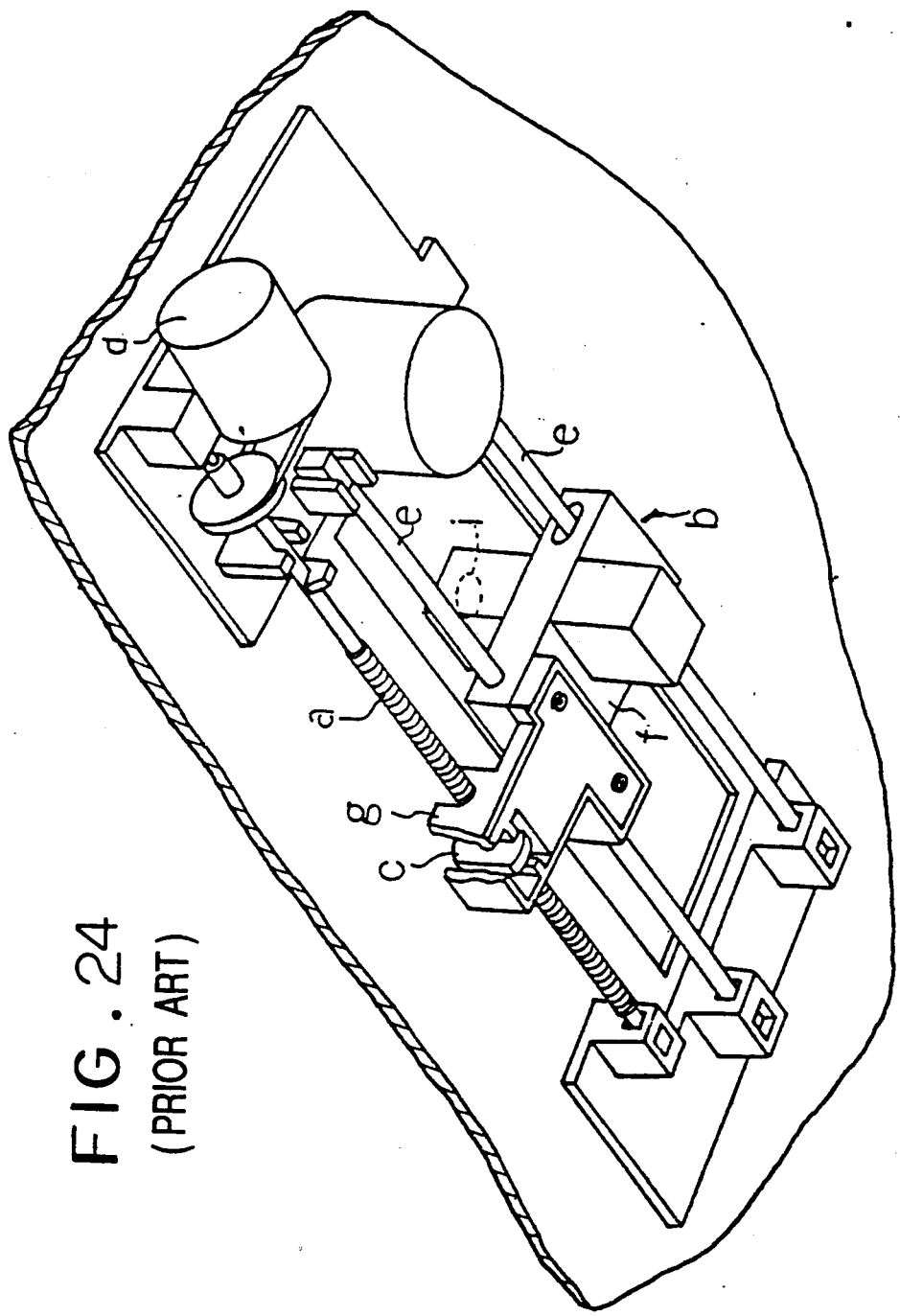
FIG. 24 and FIG. 25 are the same views as FIG. 1 and FIG. 4, respectively, according to the prior art.

FIG. 22 shows the 13th embodiment of the invention in which the protruding portion 60 is formed by bending the front end of the plate spring 6 as in the 12th embodiment shown in FIG. 20 into a V-shaped groove 64. V-shaped groove 66 is similar to the groove 64 and is made in the side of the nut 65. The groove 66 is mounted on the upper end of the boss 67 and is perpendicular to the groove 64 in opposite position. Since the position regulating means 68 is made by contacting the edges of the V-shaped grooves 64 and 66 with each other at four points, the same effect as the first embodiment is obtained. To easily form the nut 65 from plastic, the side receiving the resilient force of the plate spring 6 includes a spiral 69 and the other side forms an opening 70. The opposite ends of the opening 70 include stoppers 71.

Figure 23:
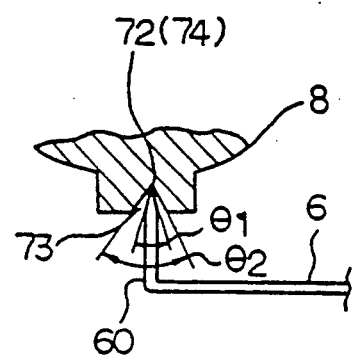
FIG. 23 is the same view as FIG. 3 according to the 14th embodiment of the invention.
Figure 25:
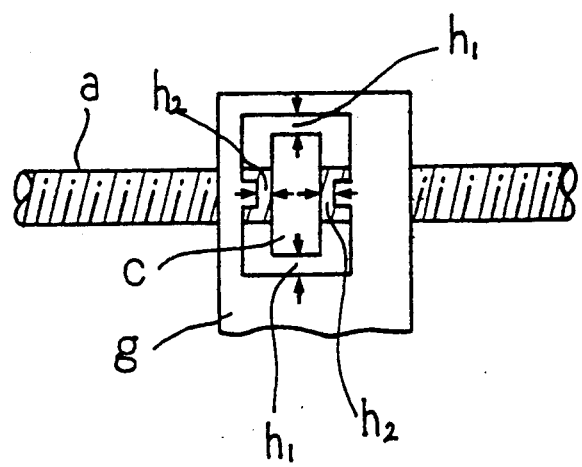

FIG. 23 shows the 14th embodiment of the invention in which the front end of the plate spring 6 is bent at a right angle so as to serve as the protruding portion 60 having a tapered end 72 of a conical or pyramidal type. In this embodiment, the end 72 and the hole 73 of the nut 8 are conical or pyramidal. Since the position regulating means 74 is made by contacting the end 72 to the deepest center of the hole 73 by setting the angle $0_2$ of the hole 73 larger than the angle $0_1$ of the end 72, the same effect as the first embodiment is obtained.

The plate spring constitutes the connecting member or becomes the main portion of the connecting member. The resilient force of the plate spring applies pressure to the nut radially of the pick-up moving screw.

Although the pick-up moving motor supplies a repeated forward or reward rotation severely or finely so as to detect the position of the pick-up unit, it is possible to reduce the vibration of the nut in the direction of rotation and to prevent frequent collision between the connecting member and the nut. Accordingly, in spite of the presence of the gap between the nut and the pick-up moving screw it is possible to restrain a generation of the impact or the vibration near the nut and to read out information from the record surely and quickly by preventing the vibration of the object lens. In addition, because the resilient force of the plate spring makes the contacting gap between the nut and the pick-up moving screw substantially zero, the nut and the pick-up unit are surely engaged with the pick-up moving screw even during rotation. The exactness for reading out information is further improved by removing operational delay of the pick-up unit due to the rotation of the pick-up moving motor.

Although particular embodiments of the invention have been illustrated in the accompanying drawings and described in the foregoing detailed description, it will be understood that the invention is not limited to the embodiments disclosed, but is intended to embrace any alternatatives, equivalents, substitutions and/or rearrangements of elements falling within the scope of the invention as defined by the following claims or their equivalents.

What is claimed is:

1. A pick-up moving mechanism for use in optical disk player, which comprises:
   (a) a pick-up unit movably supported by at least two linear guide rods;
   (b) a pick-up moving screw rotabaly mounted in a direction parallel to the linear guide rods;
   (c) a nut threaded upon the pick-up moving screw;
   (d) a connecting member integrally coupled with the pick-up unit and engaged with the nut, the connecting member being predominantly composed of a plate spring for providing a resilient force upon the nut in a direction radial to the pick-up moving screw; and
   (e) an engaging portion for engaging the nut with the contacting member, the engaging portion comprising a first pressure contact and a second pressure contact, the contacting of the first pressure contact with the second pressure contact being made at a surface that slopes with respect to a line drawn radially through the rotation axis of the pick-up moving screw in the direction of the resilient force.

2. A pick-up moving mechanism of claim 1, wherein the first pressure contact comprises a circular opening and the second pressure contact comprises a conical protrusion, whereby the circumference of the circular opening contacts a side of the conical protrusion.

3. A pick-up moving mechanism of claim 1, wherein the first pressure contact comprises a conical depression and the second pressure contact comprises a protrusion, whereby the protrusion contacts a surface within the conical depression.

4. A pick-up moving mechanism of claim 1, whereby the first pressure contact comprises a protrusion having a sloped side and a non-sloped side, the second pressure contact comprises an opening having a V-shaped projection extending from one edge, the sloped side of the protrusion contacts an edge of the opening, and the non-sloped side contacts the apex of the V-shaped projection.

5. A pick-up moving machanism of claim 1, wherein the first pressure contact comprises a protrusion having at least one sloped side and a V-shaped slot formed opposite to the sloped side in such a manner that an extension of the V-shaped slot defines a plane substantially perpendicular to the axis of the pick-up moving screw, the second pressure contact comprised having a protruding support on one side which engages with both sides of the V-shaped slot and a V-shaped projection on the opposite side which contacts the side of the protrustion opposite the V-shaped slot.

6. A pick-up moving mechanism of claim 1, wherein the connecting member further comprises a pair of movement limiters adjacent to the sides of the nut which are axially located with respect to the pick-up moving screw, so as to limit axial movement of the nut upon the pick-up moving screw.

7. A pick-up moving mechanism of claim 6, wherein the first pressure contact is mounted on the outer surface of the nut and is formed as a conical depression, the second pressure contact is mounted at end of the plate spring proximate to the nut and is formed as a conical protrusion, the angle at the apex of the depression is larger then the angle at the apex of the protrusion, and the apex of the protrusion contacts the apex of the depression.

* * * * *